United States Patent

Meline

[11] Patent Number: 5,122,088
[45] Date of Patent: Jun. 16, 1992

[54] MUTE FOR AN ELK CALL

[76] Inventor: Ralph E. Meline, 880 Sunshine Ln., Coos Bay, Oreg. 97420

[21] Appl. No.: 646,185

[22] Filed: Jan. 28, 1991

[51] Int. Cl.⁵ .................. A63H 33/40; A63H 5/00
[52] U.S. Cl. .................. 446/202; 446/406; 446/209; 84/400
[58] Field of Search .............. 446/202, 203, 204, 205, 446/206, 207, 208, 209, 213, 176, 397; 84/400

[56] References Cited

U.S. PATENT DOCUMENTS

| | | | |
|---|---|---|---|
| 181,159 | 8/1876 | Fallows | 446/209 |
| 1,576,099 | 3/1926 | Dessau | 446/209 |
| 1,855,423 | 4/1932 | Sansone | 84/400 |
| 2,782,558 | 2/1957 | Harley | 446/207 |
| 3,772,823 | 11/1973 | Herter | 446/209 |
| 3,803,755 | 4/1974 | Thompson | 446/209 |
| 4,335,539 | 6/1982 | Jones | 446/204 |
| 4,642,065 | 2/1987 | Whedon et al. | 446/209 |
| 4,976,648 | 12/1990 | Meline | 446/207 |
| 5,109,008 | 5/1991 | Hughes | 446/207 |

FOREIGN PATENT DOCUMENTS

| | | | |
|---|---|---|---|
| 385094 | 4/1908 | France | 446/209 |
| 232050 | 4/1925 | United Kingdom | 84/400 |
| 2025108 | 1/1980 | United Kingdom | 84/400 |

Primary Examiner—Mickey Yu
Assistant Examiner—D. Neal Muir
Attorney, Agent, or Firm—James D. Givnan, Jr.

[57] ABSTRACT

A mute for attachment to a game call with the mute having an elongate main body member of tubular construction. Circular rows of recesses are spaced along the elongate body member to provide a series of constructions and expansion zones. A cone shaped end member includes an expansion chamber. The main body member is of pliable plastic material.

4 Claims, 1 Drawing Sheet

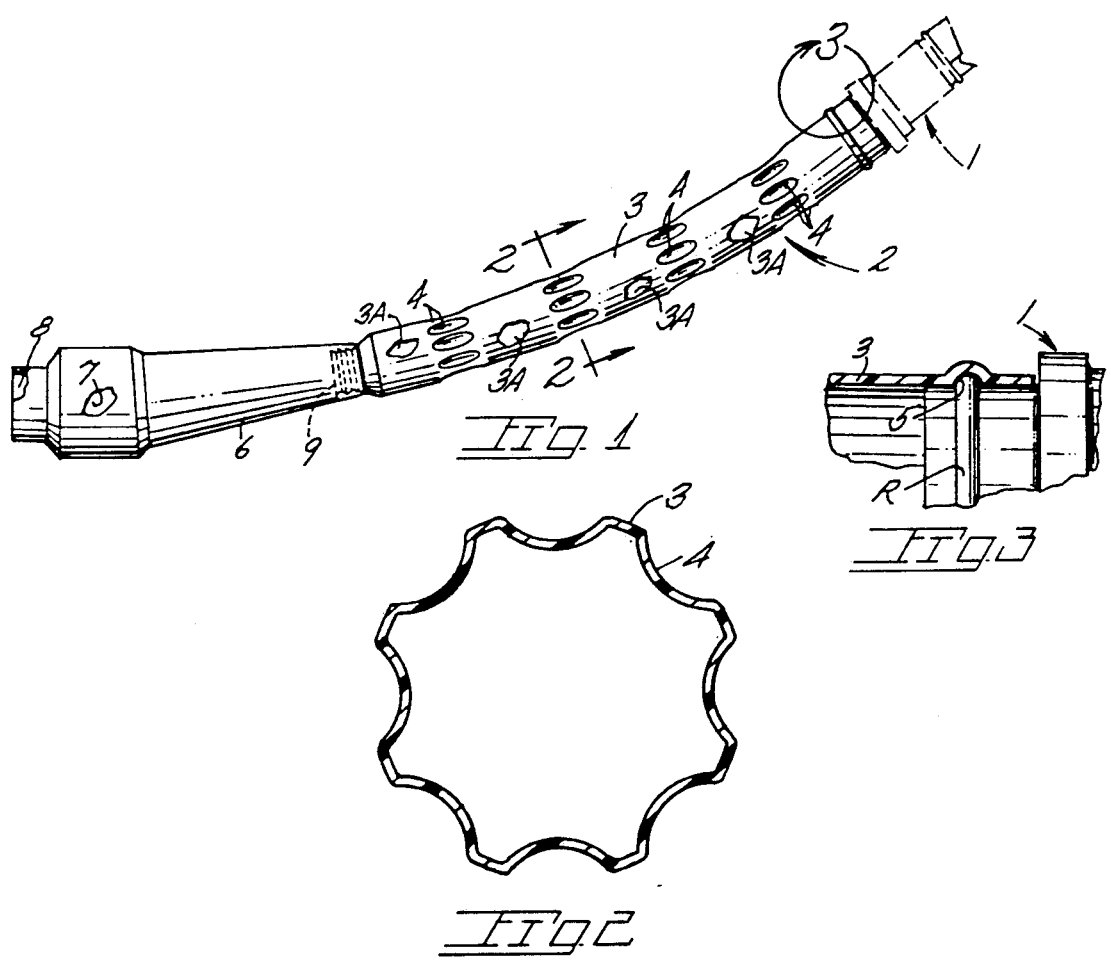

MUTE FOR AN ELK CALL

BACKGROUND OF THE INVENTION

The present invention concerns devices attachable to game calls to alter the pitch of same.

To enhance the effectiveness of game calls, it has been found desirable to provide a readily attachable mute. A mute greatly increases the number of different calls a hunter may make in the attempt to attract wild game. The effective use of a game call is particularly important when bow hunting where the animal must be drawn into close range as compared to the long range possible with a firearm.

SUMMARY OF THE INVENTION

The present invention is embodied in a mute for attachment to an animal call enabling calls of very low pitch to be made.

The mute is of tubular construction having multiple series of constrictions spaced therealong. A conical extension leads to a chamber having an outlet over which the user's hand may be partially positioned for acoustical purposes.

Recessed portions of the mute wall are arranged in circular fashion to provide annular rows of multiple restrictions spaced from one another along the mute.

The mute may be formed from a semi-rigid, synthetic plastic to retain its shape yet having the desired acoustical properties.

Important objectives of the mute include the capability of causing a significant reduction in the pitch of a game call yet being of a size to permit convenient carrying on the person in bushy areas; the provision of a mute for an animal call which is of flexible construction for compact storage purposes.

BRIEF DESCRIPTION OF THE DRAWINGS

In the accompanying drawings:

FIG. 1 is a side elevational view of the mute embodying the present invention;

FIG. 2 is a vertical sectional view taken along line 2—2 of FIG. 1; and

FIG. 3 is an enlarged fragmentary view of that portion of the mute encircled at 3 in FIG. 1.

DETAILED DESCRIPTION OF THE PREFERRED EMBODIMENTS

With continuing attention to the drawings wherein applied reference numerals indicate parts similarly hereinafter identified, the reference numeral 1 indicates generally an animal or game call suitable for use with the present mute. The game call shown is that call disclosed in U.S. Pat. No. 4,976,648 issued to the present inventor.

Indicated generally at 2 is the present mute which is of elongate tubular construction having a main body at 3. Spaced along main body 3 are annularly arranged rows each having a series of recesses or dimples 4 which, if so desired, may be of elliptical shape but not restrictively so. Between the constriction areas formed by said annularly arranged rows of recesses 4 are expansion zones 3A of main body 3.

For attachment to game call 1 the inner end of tubular main member 3 may be provided with an internal groove at 5 (FIG. 3) which seats about a rib R extending about the end of call 1.

Elongate main member 3 terminates in a conical portion 6 having an enlarged chamber 7 to provide an expansion chamber terminating in a chamber outlet 8 of the mute. If so desired conical portion 6 may be coupled to the outer end of main member 3 by means of a female threaded end segment and a male threaded end segment 9 formed on the main member.

The mute is preferably formed from a synthetic plastic of semi-rigid nature such as soft polyurethane approximately 0.030 of an inch in wall thickness.

During use of the mute the animal call 1 is grasped within one hand while the remaining hand of the user supports portion 6 of the mute. Sounds produced by animal call 1 are greatly reduced in pitch by the mute. Further, hand placement over the mouth 8 may also by used to change the pitch.

One satisfactory embodiment of the present mute has an overall length of about two feet with a main body member diameter of about one and three-quarter inches.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. A mute for attachment to a game call, said mute comprising, an elongate main body member of pliable tubular construction having an inlet end for attachment to the game call, dimples disposed in annular rows located at spaced intervals along said main body member and expansion zones spaced at intervals along said main body member between the annular rows of dimples, and
an end segment in receiving communication with said main body member, said end segment being of conical shape and having an outlet.

2. The mute claimed in claim 1 wherein said dimples are of elongate shape in plan view, said end segment including an expansion chamber terminating in said outlet.

3. A mute for attachment to a game call, said mute comprising,
a tubular main body member of pliable synthetic material and adapted at one end for attachment to an end of the game call, said member having annularly shaped spaced apart rows of dimples defining constricted areas at spaced intervals along the main body member, and
an end member at least a portion of which is of greater cross section than said main body member to provide an expansion chamber.

4. The mute claimed in claim 3 wherein said end member is internally threaded for removable attachment to said main body member.

* * * * *